United States Patent
Cittadini et al.

(10) Patent No.: US 6,785,948 B2
(45) Date of Patent: Sep. 7, 2004

(54) METHOD AND APPARATUS FOR ASSEMBLING IN AN AUTOMATED MANNER A SEALING PROFILE ON AN INNER DOOR FOR REFRIGERATORS

(75) Inventors: Paolo Cittadini, Luvinate (IT); Pierpaolo Ferrante, Cuvio (IT)

(73) Assignee: Industrie Ilpea S.p.A., Malgesso (IT)

(*) Notice: Subject to any disclaimer, the term of this patent is extended or adjusted under 35 U.S.C. 154(b) by 0 days.

(21) Appl. No.: 10/467,089

(22) PCT Filed: Jan. 23, 2002

(86) PCT No.: PCT/EP02/00668
§ 371 (c)(1), (2), (4) Date: Dec. 16, 2003

(87) PCT Pub. No.: WO02/066912
PCT Pub. Date: Aug. 29, 2002

(65) Prior Publication Data
US 2004/0078951 A1 Apr. 29, 2004

(30) Foreign Application Priority Data
Feb. 2, 2001 (IT) .................................. MI2001A0202

(51) Int. Cl.[7] .............................................. B23P 11/00
(52) U.S. Cl. .................. 29/450; 29/453; 312/296; 312/116; 49/303; 49/317; 49/479.1; 49/408.1; 277/925
(58) Field of Search .................. 29/428, 437, 449, 29/453, 505, 509, 521, 717, 782, 789, 450, 235; 312/1, 116, 296; 49/303, 316, 317, 479.1, 480.1, 489, 492.1, 496; 414/759, 768, 771, 776; 277/307, 925

(56) References Cited

U.S. PATENT DOCUMENTS 2,700,194 A * 1/1955 Rasmussen ............... 49/496.1
3,179,987 A * 4/1965 Banzet ..................... 49/489.1
4,469,383 A * 9/1984 Losert ....................... 312/296
4,829,652 A   5/1989 Haas et al.
5,018,264 A   5/1991 Kautt
5,060,358 A * 10/1991 Haas et al. ................. 29/235
5,606,828 A   3/1997 Hall et al.
6,042,202 A * 3/2000 Goppion ................... 312/140

FOREIGN PATENT DOCUMENTS

| DE | 3022381    | 12/1981 |
|----|------------|---------|
| DE | 0 690 197  | 1/1996  |
| EP | 0 146 994  | 7/1985  |
| EP | 0 152 123 A| 8/1985  |
| EP | 0 152 989  | 8/1985  |
| EP | 0 319 087  | 6/1989  |
| EP | 0 905 464  | 3/1999  |
| EP | 0 959 312 A| 11/1999 |

OTHER PUBLICATIONS

International Search Report mailed Jun. 13, 2002 PCT/EP02/00668.
International Preliminary Examination Report completed Aug. 13, 2002 PCT/EP02/00668.

* cited by examiner

Primary Examiner—David P. Bryant
Assistant Examiner—Stephen Kenny
(74) Attorney, Agent, or Firm—Abelman, Frayne & Schwab

(57) ABSTRACT

The invention relates to a method and apparatus for assembling in an automated manner a sealing profile on an inner door for refrigerators. The method comprises the stages of: a) providing said profile (1) in the form of a frame welded at the corners, b) stably resting said frame on a support (10), c) gripping said section (4) along all the sides of said frame using engaging means (12) so as to perform said elastic splaying, d) retaining said sections (4) in the splayed position, e) positioning said inner door (31) on said sections (2) of said profile base, f) releasing said sections (4) so as to allow the elastic return of the profile base onto the edge of the inner door, g) extracting inner door and profile thus assembled from said support.

10 Claims, 8 Drawing Sheets

Figure 1:
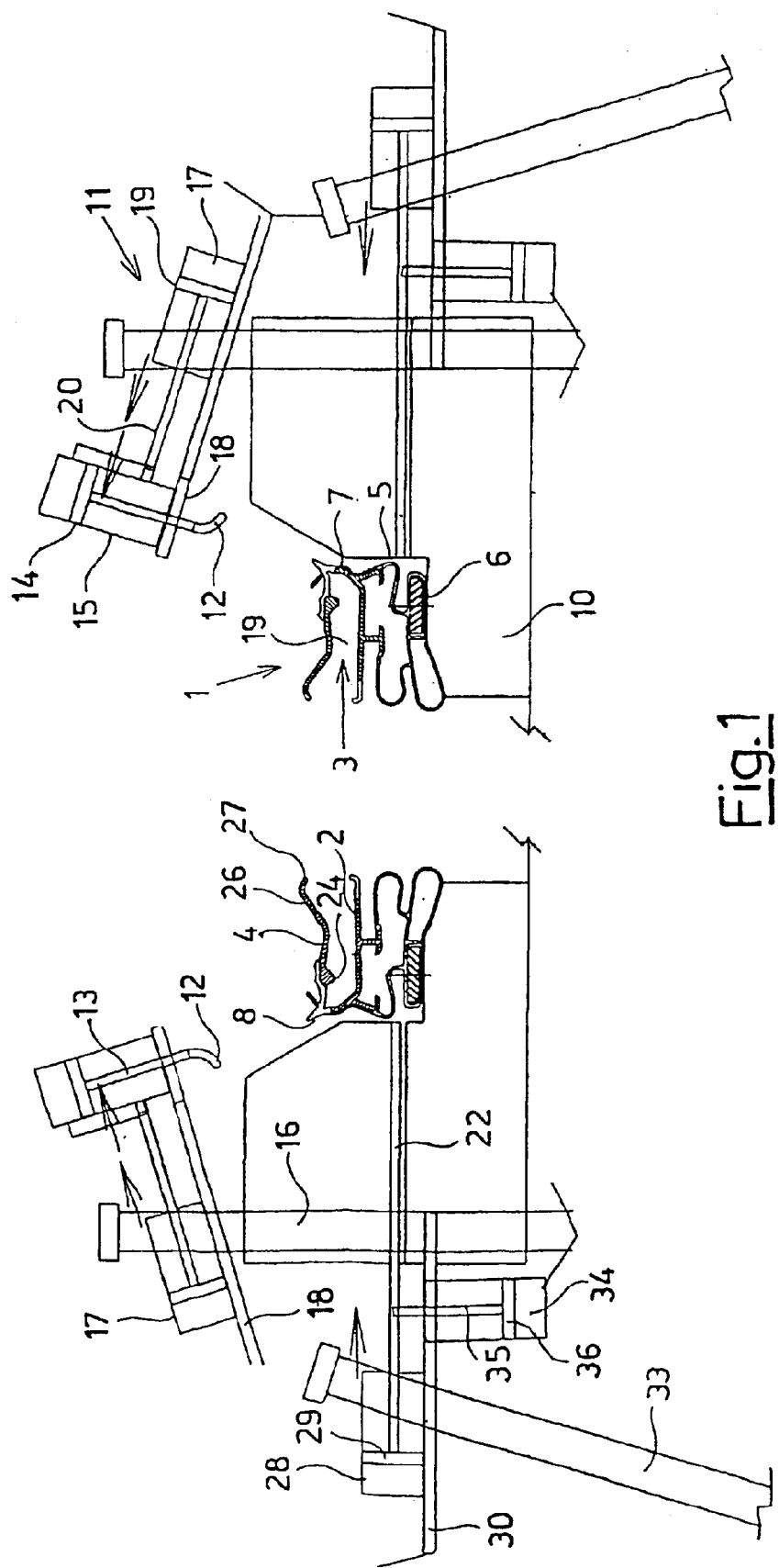

METHOD AND APPARATUS FOR ASSEMBLING IN AN AUTOMATED MANNER A SEALING PROFILE ON AN INNER DOOR FOR REFRIGERATORS

The patent application EP 905464 A1 in the name of the same Applicant describes a plastic profile for refrigerator furniture units and the like provided with door and an inner door, having a bellows seal portion which forms a sealed closure between the door and the furniture, the profile and the seal portion being joined together or integral as a single piece produced by means of coextrusion of two materials having a different rigidity so as to allow, if necessary, easy separation of the seal portion from the profile along their joining zone, said profile having a groove able to receive a replacement bellows seal portion, said groove being defined by a pair of walls which extend vertically or obliquely from a base formed with a substantially C-shaped cross-section comprising two horizontal upper and lower sections, the latter being elastically splayable as a result of an elbow piece made of soft material and formed by means of coextrusion on the cross-section itself, this elbow piece therefore acting as a hinge so as to allow elastic splaying of said C-shaped cross-section, in particular of said lower section, so as to receive by means of snap-engagement the edge of said inner door inside the cross-section itself, and externally and underneath said C-shaped cross-section the profile forming a seal on the edge of said door.

For the purposes of installation, the profile with the coextruded seal is advantageously provided in the form of a rectangular frame welded at the corners and then assembled together with inner door and door, as is for example described also in the European patents Nos. 146,994 and 319,087 in the name of the same Applicant.

More particularly, according to the patent application EP 905464, the profile with the seal is welded so as to form a rectangular frame which may thus be mounted on an inner door of the same shape, generally with perimetral dimensions 0.5–3 mm smaller than the internal dimension delimited by the vertical section of the base of the profile. This assembly is made possible by means of shearing of the lower horizontal section of said base, performed automatically during extrusion (or by acting on the end part of the ready-cut portions) to a depth of 3–5 mm and over the whole of its extension, thereby making it possible to avoid welding in the corners of this section.

Each section therefore is excluded from welding and can therefore be splayed independently, by means of its hinging point, through angles even greater than 90° so as to allow insertion of the inner door.

The operation of splaying of the abovementioned section may be generally performed manually by raising this lower section of all four sides of the frame through an angle sufficient for positioning of the inner door. Once this operation has been performed, the sections are released and the hinge brings them back by means of snap-engagement into their initial position, locking the inner door in the C-shaped cross-section of the base of the profile.

The profile and the inner door thus assembled are then placed on the door and the whole assembly is fixed by introducing foam into the cavity between door and inner door.

The profile, when it is inserted on the inner door, forms a single assembly therewith which must be moved, being able to withstand also in certain cases sudden stresses, without causing separation of the assembled parts.

This condition is very important when the two assembled parts are positioned on the foaming moulds, since rapid, precise and safe operation is possible only when it is ensured that said parts remain in a fixed position, without mutual displacement.

The present invention relates to a method, and the associated apparatus for implementing it, able to perform automated assembly of this kind of profile on the inner door of a refrigerator. More specifically, the present invention relates to a method for assembling in an automated manner on an inner door a profile (1) made of substantially rigid plastic, for refrigerator furniture units and the like provided with door and an inner door (31), having a seal which is made of substantially soft plastic and forms a sealed closure between the door and the furniture, the profile and the seal portion being joined together or integral as a single piece produced by means of coextrusion of two materials having a different rigidity, said profile having a base (3) formed with a substantially C-shaped cross-section defined by two substantially horizontal sections, i.e. an upper section (2) and lower section (4), and by a substantially vertical or oblique section (7), said cross-section being elastically splayable as a result of an elbow piece (8) made of soft material and formed by means of coextrusion on the cross-section itself, this elbow piece therefore acting as a hinge for allowing elastic splaying of said section (4) of said C-shaped cross-section so as to receive by means of snap-engagement the edge of said inner door (31) inside (19) the cross-section itself, characterized in that it comprises the stages of: a) providing said profile (1) in the form of a frame welded at the corners, b) stably resting said frame on a support (10), c) gripping said section (4) along all the sides of said frame using engaging means (12) so as to perform said elastic splaying, d) retaining said sections (4) in the splayed position, e) positioning said inner door (31) on said sections (2) of said profile base, f) releasing said sections so as to allow the elastic return of the profile base onto the edge of the inner door, g) extracting inner door and profile thus assembled from said support.

The invention also relates to an apparatus for performing said assembly method, comprising a support (10) for resting thereon said profile (1) in the form of a frame welded at the corners, and a device (11) comprising a first cylinder 17 supported by a rotatable platform 18 on which it is arranged horizontally and inside which there is a piston 19 which actuates a rod 20 which may impart a translatory movement to a second cylinder 15 which actuates an engaging means 12 translatable along its longitudinal axis as a result of sliding of an arm 13 which supports it, actuated by a piston contained inside the cylinder itself, said engaging means (12) being retractable.

So that characteristic features and advantages of the invention may be better understood, a non-limiting example of embodiment thereof is described below with reference to FIGS. 1 to 8 of the accompanying drawings. Said figures illustrate in a schematic manner a corresponding number of stages in the assembly sequence.

The profile shown in the example in question forms in particular the subject of a simultaneous patent application filed by the same Applicant and constitutes an improvement to the abovementioned profile according to European patent No: 905464. Therefore it is described within the scope of the present invention only in summary form in particular as regards the said base of the profile affected by the splaying movement which is of relevance in the assembly method described here and, for the remaining details, reference should be made directly to said simultaneously filed application.

In the profile shown in the drawings, denoted overall by 1, the base 3 is essentially formed with a C-shaped cross-section defined by two horizontal sections 2 and 4, i.e. defined as an upper section and a lower section respectively (the profile is in an overturned position during the assembly process illustrated in the drawings), and a substantially vertical/oblique section 7 inside which a seat 19 is defined. Said vertical/oblique section 7 and said lower horizontal section 4 are joined together by an elbow-piece 8 made of soft material and formed by means of coextrusion on the cross-section itself with the rigid material which forms the base 3 of the profile, this elbow piece 8 acting as a hinging point for allowing elastic splaying of said C-shaped cross-section, in particular of the lower horizontal section 4 with respect to the sections 2 and 7.

Figure 6:
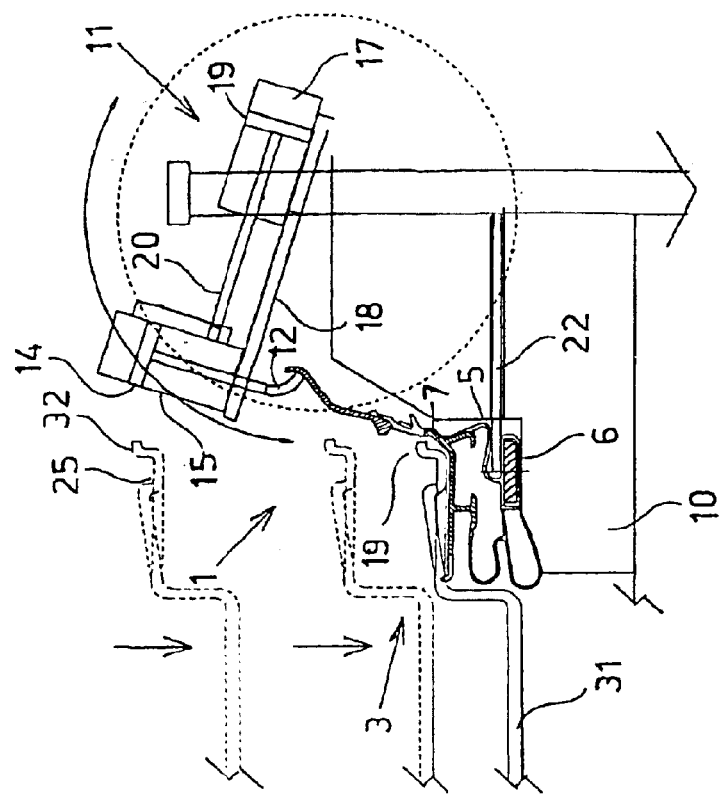
Figure 6:
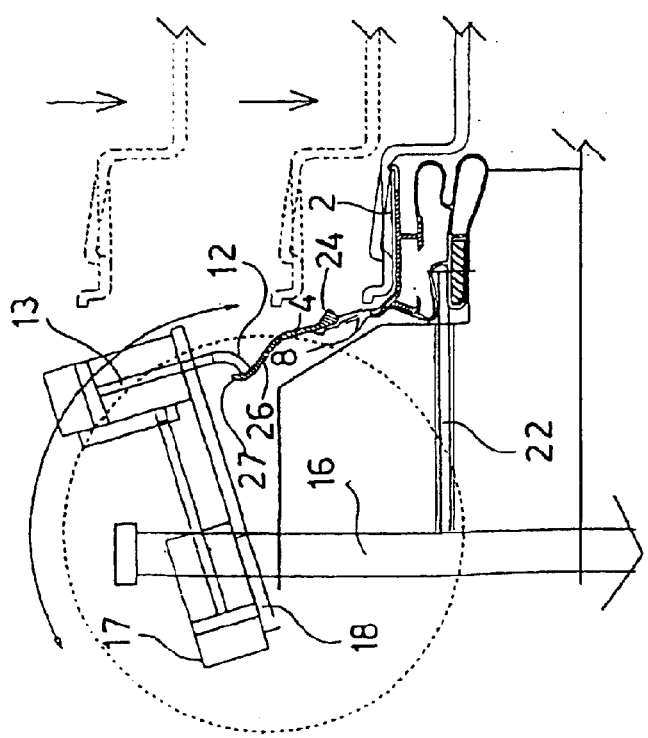
Figure 7:
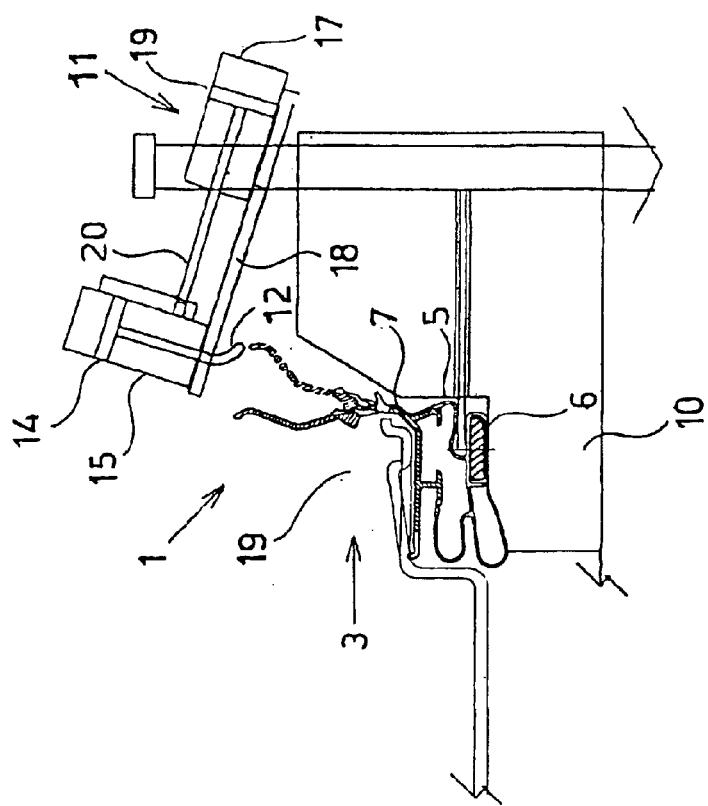
Figure 7:
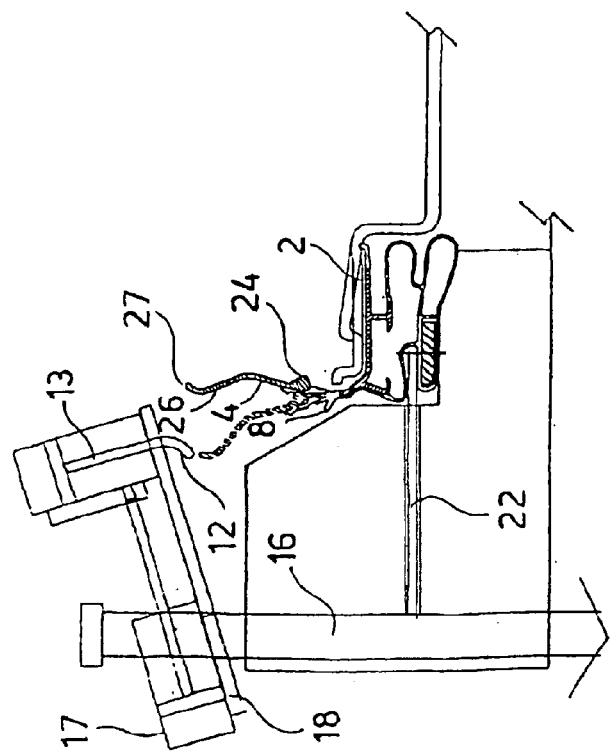
Figure 8:
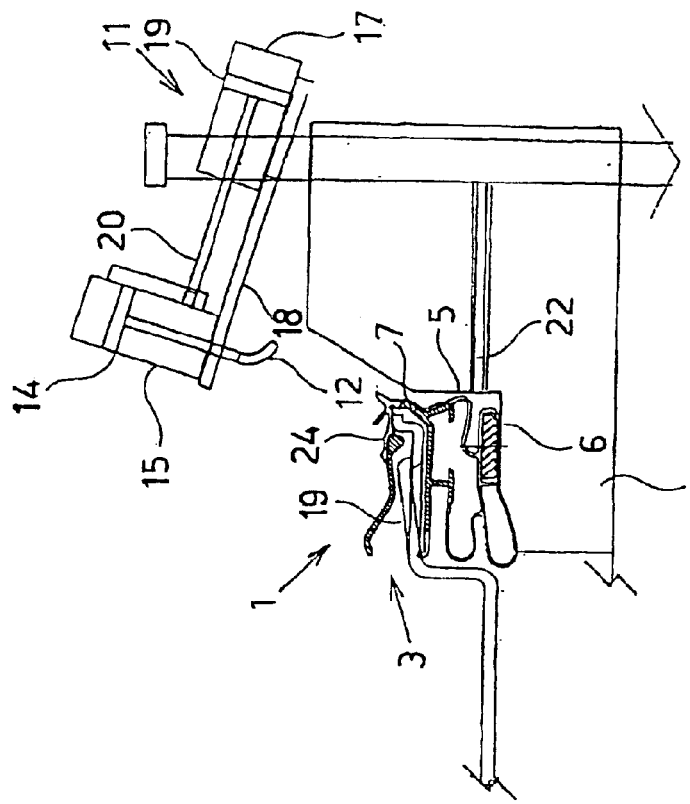
Figure 8:
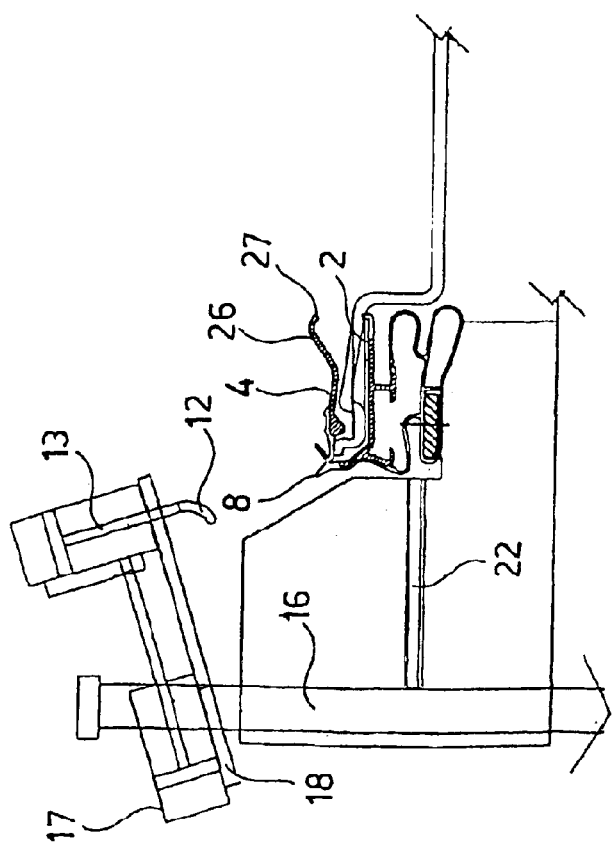

According to the example, the lower section 4 of the base 3 is formed in the manner of a projection 24 directed towards said upper section 2 and able to engage operationally with a grooved seat 25 having a matching shape (in particular U shape) formed on the inner door 31 in the region of the edge of the latter (FIGS. 6–8). In order to be able to receive the edge of the inner door formed with this U-shaped groove, the interspace 10 in the C-shaped cross-section of the base 3 must be sufficiently wide and for this purpose the substantially vertical section 7 is at least partly directed obliquely. In the example shown in the Figure, this projection 24 is formed at the end of the section 4 of the rigid base of the profile which is located close to the soft elbow piece 8, while at the opposite end the section 4 is formed first with an oblique section 26 and finally with an edge 27 curved back in the opposite direction, so as to form a kind of S in order to facilitate both engagement with said engaging means for splaying of the base of the profile and fastening to the inner door 31. The latter has a perimetral edge 32 having, running along it, a grooved seat 25 able to mate with said projection 24 of the profile. Above it, the latter comprises a bellows seal, the obliquely directed side wall 5 of which, terminating in a magnetic insert 6, is shown.

The apparatus shown in the drawings is now described. This apparatus comprises essentially a support 10 for resting thereon the profile 10 with seal provided in the form of a frame welded at the corners, and a robot comprising a plurality of devices 11 suitable for manipulating said splayable section 4 of the base 3 of the profile, in particular for splaying it initially and then releasing it. Since the profile is in the form of a frame, the support 10 is a quadrilateral which reproduces substantially the dimensions thereof and which must receive, inside it, the inner door as shown in the final figures of the assembly sequence. It is pointed out that, in each figure of the accompanying drawings, each schematic view of the apparatus consists if an elevation view opposite the short side of the said quadrilateral, the two corners of which facing each other along this-side are shown, the apparatus and profile being located, during every stage, in a mirror arrangement with respect to each other. The space between said facing corners has been reduced in the drawings owing to dimensional requirements such that the inner door 31 visible in FIGS. 6 to 8 is shown split in the middle.

The number of devices 11 distributed along the perimeter of the support 10 may vary widely. As well as being provided at the four corners of the quadrilateral, a greater number of them are also envisaged along the long sides of the frame so as to allow splaying which is as uniform as possible.

Each device 11 comprises an upright 16 on which there is pivotably mounted a platform 18 which supports a first cylinder 17 arranged horizontally and able to rotate in the direction indicated by the arrow shown above the broken line in FIGS. 3 and 4 in the drawings. Inside the cylinder 17 there is a piston 19 which actuates a rod 20 which may thus impart a translatory movement to a second cylinder 15 which, in the rest position shown for example in FIG. 1, is also supported by the platform 18 on which it rests being arranged vertically, therefore having its longitudinal axis perpendicular with respect to that of the first cylinder 17.

This cylinder 15 actuates an engaging means 12 translatable along its longitudinal axis, for example as a result of the sliding of an arm 13 which supports it actuated by a piston 14 contained within the cylinder itself, this engaging means being retractable.

FIG. 1 shows the initial position in which the frame formed by four welded pieces of the profile 1 has been positioned on the quadrilateral consisting of the support 10, and the device 11 is inactive in the rest position.

Figure 2:
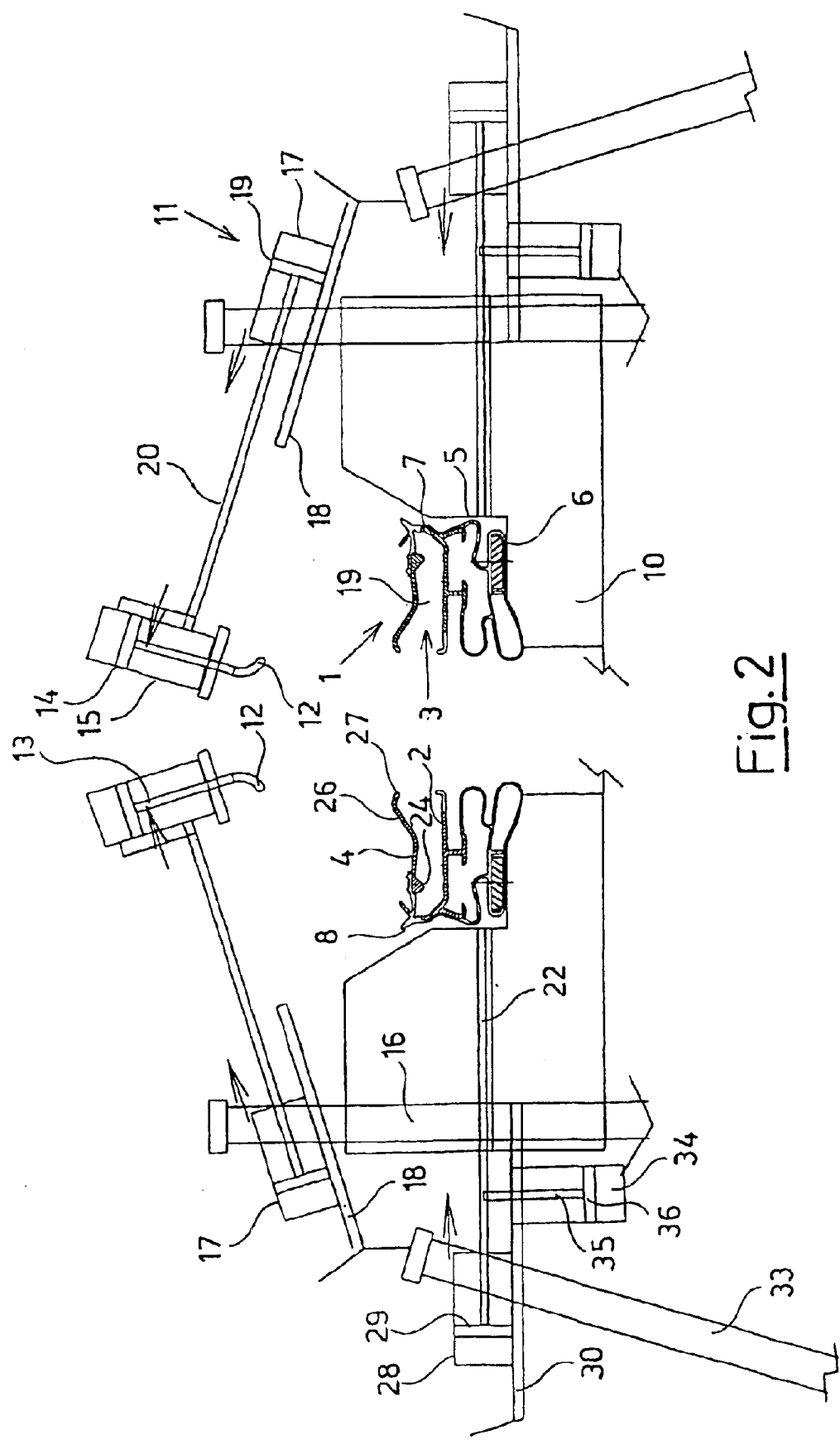

In FIG. 2, the rod 20 of the cylinder 17 causes translation of the cylinder 15 as far as the position shown, where the engaging means 12 is displaced beyond the end 27 of the base of the profile.

Figure 3:
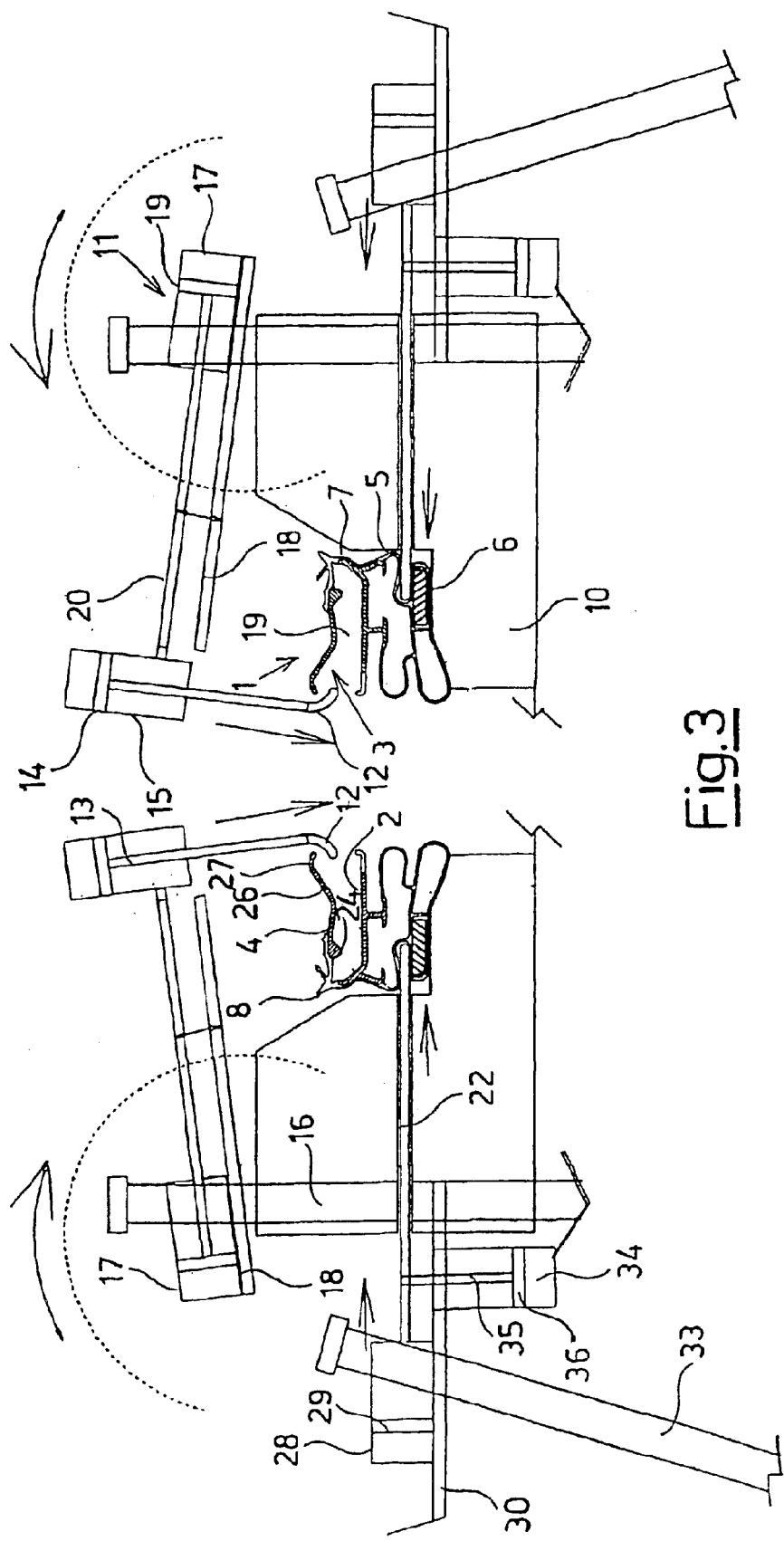

From this position, the platform 18 rotates in the direction indicated by the arrow shown in FIG. 3, causing the cylinder 15 to descend into the lowered position such that the simultaneous extending movement of the arm 13 brings the engaging means 12 outside of and at the height of the said end 27. As soon as it has reached this position, as again shown in FIG. 3, the rod 20 actuated by the piston 19 is retracted so as to position the engaging means 12 precisely below the end 27 of the base of the profile, ready to act in an ideal position for splaying thereof. As stated above, this is facilitated by the special S-shaped form (along 26 and 27) of the section 4 of the base of the profile.

Figure 4:
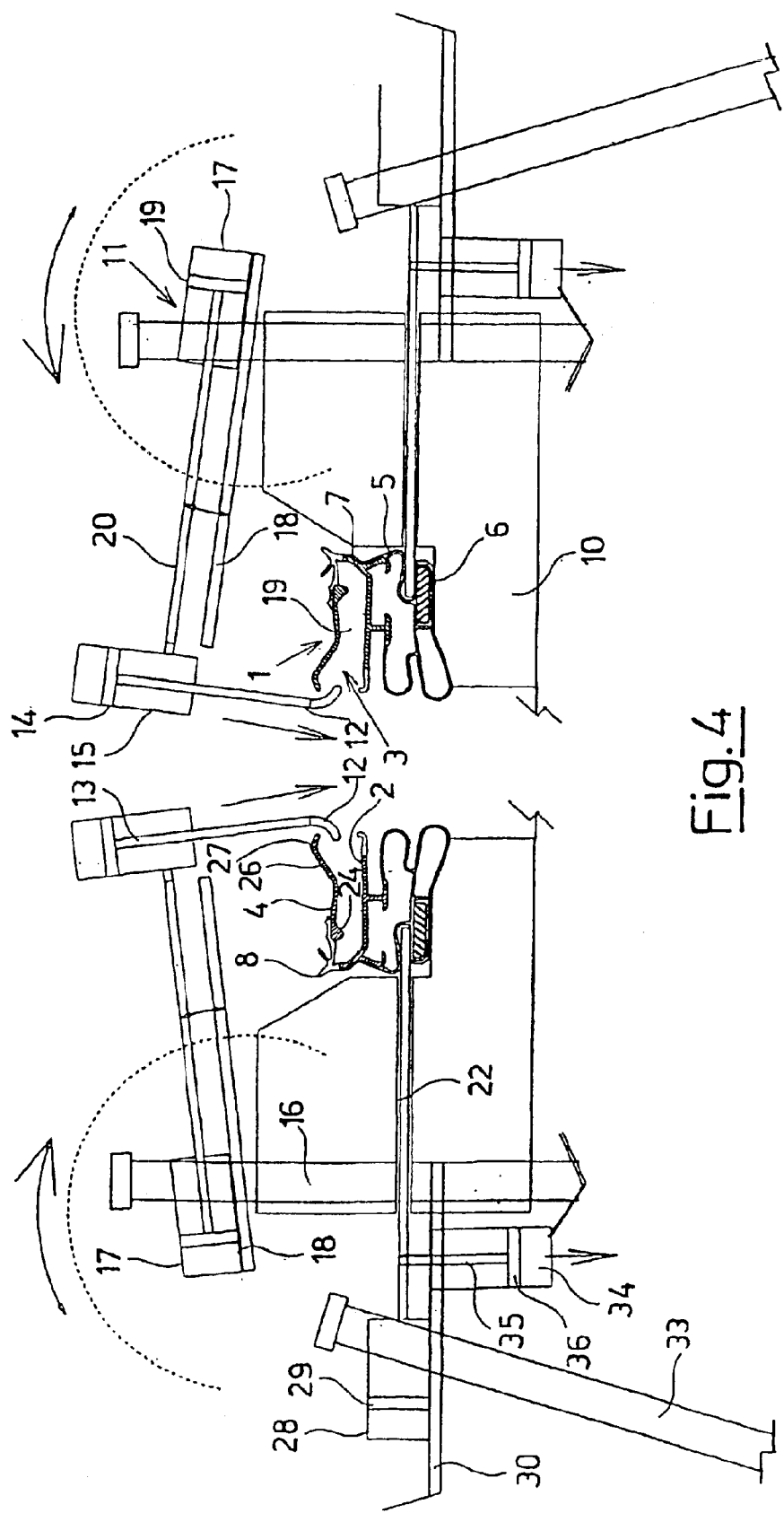

Resting and positioning of the profile on the support must be stable during the assembly steps so as to prevent undesirable displacement thereof. Therefore the support comprises stabilisation means such as a plate 22 retractable for example by means of a sliding rod actuated by a system comprising cylinder 28 and piston 29. Said stabilisation means are inserted laterally into the profile, in particular said retractable plate 22 is inserted into the interspace defined between said wall 5 and said magnetic insert 6, as shown in FIG. 3. FIG. 4 shows a second successive position of this plate 22 which, after being inserted into the profile, is compressed against the magnetic insert 6 so as to keep it in position against the support 10. For this purpose a system comprising cylinder 34 and piston 36 which actuates a small rod 35 joined to the plate 22 is envisaged. Both the cylinders 28 and 34 are integral with a platform 30 supported by an upright 33. The two cylinders are arranged there along longitudinal axes which are perpendicular to each other, such that the first cylinder imparts a translatory movement to the plate 22, while the cylinder 34 lowers the plate from the position for insertion into the profile, shown in FIG. 3, into the operating position for compression against the support 10, shown in FIG. 4, which remains during the course of said stages c) to f).

It is pointed out that, for the sake of simplicity of the drawings, this system for actuating the retractable plate 22 is shown only in FIGS. 1 to 4.

Figure 5:
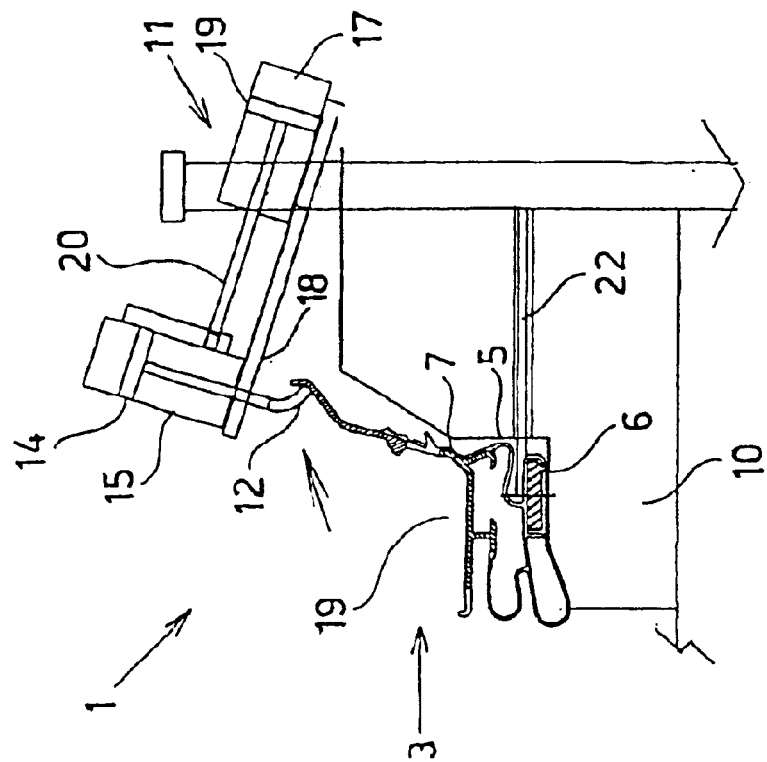
Figure 5:
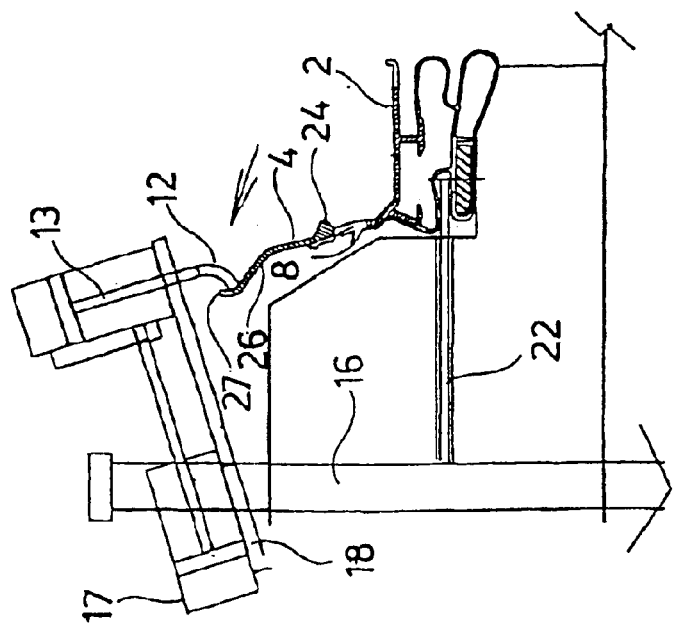

FIG. 5 shows the following stage for splaying the section 4 of the base of the profile, obtained as a result of retraction of the arm 13, the engaging means 12 of which from the position shown in FIG. 4 has engaged with the end 27, and simultaneous rotation in the reverse direction, this time upwards, of the platform 18 integral with the system comprising cylinder 17, rod 20 and cylinder 15, which therefore reassumes the initial position shown in FIG. 1. The base of the profile, drawn along by the engaging means, may thus be completely splayed without moving from the support 10 since the plate 22 continues to act as shown in FIG. 4.

In FIG. 6 the device 11 has reassumed the initial position shown in FIG. 1, in which said engaging means 12 retain the section 4 of the base of the profile 1 in the splayed position. At this point the said inner door 31 may be assembled, being lowered from above on top of the welded frame, as shown in broken lines, into the resting position shown in solid lines.

FIG. 7 shows the next stage during which the engaging means 12 is retracted towards the inside of its cylinder 15 with respect to the previous position so that it thus frees the end 27 of the base of the profile.

Once this operation has been performed, the sections 4 are released and the hinge 8 of the profile brings them back by means of snap-engagement into the position shown in FIG. 8, locking the inner door between the section 4 and the section 2 of the base of the profile. As it returns elastically, the projection 24 of the section 4 snap-engages into the grooved seat 25 on the edge of the inner door.

Therefore the projection 24 and the grooved seat 25 form a centring system during relative positioning for assembly of profile and inner door. By providing the automated system with suitable sensors, it is therefore possible to prevent there from being errors in positioning of the inner door on the frame so that the only accepted position is that in which elastic return of the section 4 senses that the projection 24 has been received by the grooved seat 25.

The profile, when it is inserted on the inner door, in addition forms a single unit therewith which may be safely transported, withstanding even any sudden movements without causing separation, as a result of the interference between grooved seat 25 and projection 24.

In this position, shown in FIG. 8, the lower sections 4 of the profile elastically act against the prestressed edge of the inner door 31. The engagement between the projection 24 on the profile and the corresponding grooved seat 25 formed on the inner door ensures fixing between its parts along the whole perimeter of the inner door so as to ensure a stable connection, without the risk of relative displacement even under the effect of sudden stresses which may be imparted by the machinery.

After retracting the plate 22 into the original rest position according to FIG. 1, as shown in FIG. 8, the profile 1 and the inner door 31 thus assembled may at this point be gripped, for example by a vacuum suction cup which is made to adhere to the centre of the inner door, and positioned on the refrigerator door by means of a system—optionally robotized—so that the whole unit may be fixed by introducing foam into the cavity between door and inner door.

From that described above, it can be understood how the invention generally allows assembly of the sealing profile and inner door which is very much more rapid, low-cost and reliable compared to the prior manual method.

Moreover, in the case of the embodiment of the example illustrated in the accompanying drawings, it is possible to achieve the further advantage of having a system for centring the inner door on the profile which ensures an entirely reliable end result as regards automated assembly of the whole system.

What is claimed is:

1. Method for assembling in an automated manner on an inner door a profile (1) made of substantially rigid plastic, for refrigerator furniture units and the like provided with door and an inner door (31), having a seal which is made of substantially soft plastic and forms a sealed closure between the door and the furniture, the profile and the seal portion being joined together or integral as a single piece produced by means of coextrusion of two materials having a different rigidity, said profile having a base (3) formed with a substantially C-shaped cross-section defined by two substantially horizontal sections, i.e. an upper section (2) and lower section (4), and by a substantially vertical or oblique section (7), said cross-section being elastically splayable as a result of an elbow piece (8) made of soft material and formed by means of coextrusion on the cross-section itself, this elbow piece therefore acting as a hinge for allowing elastic splaying of said section (4) of said C-shaped cross-section so as to receive by means of snap-engagement the edge of said inner door (31) inside (19) the cross-section itself, characterized in that it comprises the stages of: a) providing said profile (1) in the form of a frame welded at the corners, b) stably resting said frame on a support (10), c) gripping said section (4) along all the sides of said frame using engaging means (12) so as to perform said elastic splaying, d) retaining said sections (4) in the splayed position, e) positioning said inner door (31) on said sections (2) of said profile base, f) releasing said sections so as to allow the elastic return of the profile base onto the edge of the inner door, g) extracting inner door and profile thus assembled from said support.

2. Method according to claim 1, characterized in that said lower section (4) of said base (3) is formed with a projection (24) directed towards said upper section (2) and able to engage operationally with a corresponding grooved seat (25) formed on said inner door (31).

3. Method according to claim 1, characterized in that said engaging means (12) are retractable so that said stage f) of releasing said sections (4) is performed by retracting said engaging means (12).

4. Method according to claim 1, characterized in that said section (4) is formed with an oblique section (26) and with an edge (27) curved back in the opposite direction, so as to form a kind of S in order to facilitate engagement with said engaging means for splaying the base of the profile.

5. Method according to claim 1, characterized in that said stage of stably resting said frame on a support (10) is performed by means of a retractable plate (22).

6. Method according to claim 5, characterized in that said retractable plate (22) is inserted laterally into an interspace in said seal and compresses it against said support.

7. Apparatus for performing an assembly method according to any of the preceding claims, characterized in that it comprises a support (10) for resting thereon said profile (1) in the form of a frame welded at the corners, and a device (11) comprising a first cylinder 17 supported by a rotatable platform 18 on which it is arranged horizontally and inside which there is a piston (19) which actuates a rod (20) which may impart a translatory movement to a second cylinder (15) which actuates an engaging means (12) translatable along its longitudinal axis as a result of sliding of an arm (13) which supports it, actuated by a piston (14) contained inside the cylinder itself, said engaging means (12) being retractable.

8. Apparatus according to claim 7, characterized in that it comprises a retractable plate (22) for locking said profile against said support (10) during the course of said stages c) to f).

9. Apparatus according to claim 8, characterized in that said retractable plate (22) is actuated by a rod slidable by means of a system comprising cylinder (28) and piston (29).

10. Apparatus according to claim 9, characterized in that locking of said plate (22) against said support (10) is performed by means of a system comprising cylinder (34) and piston (36) which actuates a small rod (35) joined to the plate (22) which lowers it from the position for insertion into said profile into an operating position for compression against the support (10), which remains during the course of said stages c) to f).

* * * * *